(12) United States Patent
Fukumoto

(10) Patent No.: US 8,851,209 B2
(45) Date of Patent: Oct. 7, 2014

(54) WORKING VEHICLE

(75) Inventor: Takeshi Fukumoto, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/122,090

(22) PCT Filed: Feb. 7, 2012

(86) PCT No.: PCT/JP2012/052757
§ 371 (c)(1),
(2), (4) Date: Nov. 25, 2013

(87) PCT Pub. No.: WO2013/001845
PCT Pub. Date: Jan. 3, 2013

(65) Prior Publication Data
US 2014/0097029 A1 Apr. 10, 2014

(30) Foreign Application Priority Data

Jun. 30, 2011 (JP) .................................. 2011-146068
Jun. 30, 2011 (JP) .................................. 2011-146069
Jun. 30, 2011 (JP) .................................. 2011-146070

(51) Int. Cl.
| B62D 55/00 | (2006.01) |
| B62D 55/04 | (2006.01) |
| B62D 55/02 | (2006.01) |
| B62D 55/14 | (2006.01) |
| B62D 55/30 | (2006.01) |
| B62D 55/084 | (2006.01) |
| B62D 55/10 | (2006.01) |

(52) U.S. Cl.
CPC ................ B62D 55/02 (2013.01); B62D 55/14 (2013.01); B62D 55/305 (2013.01); B62D 55/084 (2013.01); B62D 55/10 (2013.01)
USPC .......................... 180/9.21; 180/9.26; 180/9.34

(58) Field of Classification Search
CPC ..... B62D 55/10; B62D 55/1086; B62D 55/12; B62D 55/14
USPC .................................... 180/9.34, 9, 9.21, 9.26
See application file for complete search history.

(56) References Cited

U.S. PATENT DOCUMENTS

| 2,310,775 | A | * | 2/1943 | Gavagnin ..................... 180/9.46 |
| 2,813,760 | A | * | 11/1957 | Spanjer ......................... 305/139 |
| 5,273,126 | A | | 12/1993 | Reed et al. |
| 6,334,496 | B1 | * | 1/2002 | Hiraki et al. ................... 180/9.5 |

(Continued)

FOREIGN PATENT DOCUMENTS

| EP | 2130749 A1 * | 12/2009 | ........... B62D 55/108 |
| JP | 53-71428 | 6/1978 | |

(Continued)

*Primary Examiner* — Joseph M Rocca
*Assistant Examiner* — Daniel Yeagley
(74) *Attorney, Agent, or Firm* — Jordan and Hamburg LLP

(57) ABSTRACT

To achieve a simplification and a weight saving of a support structure to a track frame and a travel machine body a working vehicle is provided with the travel machine body which mounts an engine thereon, the track frame which is arranged in a lower portion of the travel machine body, and a travel crawler which is installed to the track frame via a drive wheel body and driven wheel bodies. The track frame is structured such that a pair of steel plate bodies are detachably fastened by fastening members wide surfaces of the steel plate bodies being faced to each other.

7 Claims, 8 Drawing Sheets

(56) References Cited

U.S. PATENT DOCUMENTS

| | | | |
|---|---|---|---|
| 7,255,184 B2* | 8/2007 | Loegering et al. | 180/9.26 |
| 7,552,979 B2* | 6/2009 | Christianson | 305/129 |
| 2007/0261898 A1* | 11/2007 | Bessette | 180/9.21 |
| 2010/0139994 A1* | 6/2010 | Hansen | 180/9.26 |
| 2010/0230185 A1* | 9/2010 | Mallette et al. | 180/9.44 |
| 2012/0217071 A1* | 8/2012 | Fukumoto et al. | 180/9.34 |

FOREIGN PATENT DOCUMENTS

| | | |
|---|---|---|
| JP | 4-505902 | 10/1992 |
| JP | 6-40356 | 2/1994 |
| JP | 10-045051 | 2/1998 |
| JP | 10-45053 | 2/1998 |
| JP | 10-119834 | 5/1998 |
| JP | 2001-48066 | 2/2001 |
| JP | 2002-274447 | 9/2002 |
| JP | 2003-54389 | 2/2003 |
| JP | 2004-217054 | 8/2004 |
| JP | 2006-096199 | 4/2006 |
| WO | WO-97/37885 | 10/1997 |
| WO | WO-2012/029783 | 3/2012 |

* cited by examiner

WORKING VEHICLE

TECHNICAL FIELD

The present invention relates to a working vehicle such as a tractor in which right and left travel crawlers are installed in a rear portion of a travel machine body mounting an engine or the like thereon.

BACKGROUND OF THE INVENTION

It is described in Patent Documents 1 to 3 which correspond to a prior art that right and left travel crawlers are installed in a rear portion of a travel machine body in a working vehicle, that is, right and left front wheels are installed in a front portion of the travel machine body, and the right and left travel crawlers are installed in the rear portion of the travel machine body.

The prior art is a structure in which a rear axle is pivoted to a rear axle case of a travel machine body, a drive wheel body is attached to the rear axle, a track frame extending in a back and forth direction is arranged at a position which is below the rear axle case, and a travel crawler is installed to the track frame, wherein a midstream portion in the back and forth direction of the track frame is rotatably pivoted to the travel machine body side (for example, the rear axle case) by one oscillation supporting point shaft which is arranged at a position which is at an appropriate distance below the rear axle, and the track frame is structured such that a front portion and a rear portion thereof move up and down in a reverse direction to each other. Further, the travel machine body is structured such as to be moved forward or moved backward by winding the travel crawler in an approximately triangular shape around a front driven wheel body which is provided in a front end side of the track frame, a rear driven wheel body which is provided in a rear end side, and the drive wheel body, and rotationally driving the travel crawler by the drive wheel body.

CITATION LIST

Patent Literature

Patent Document 1: Japanese Unexamined Patent Application Publication No. 10-45051
Patent Document 2: Japanese Unexamined Patent Application Publication No. 2006-96199
Patent Document 3: Japanese Unexamined Patent Application Publication No. 2004-217054

However, in the structure of the prior art, since the track frame is a heavy load which is made of a square pipe, and the support of the track frame to the travel machine body is achieved by one-point support established by the oscillation supporting point shaft, the load has tended to be concentrated on the oscillation supporting point shaft portion, and there has been a risk that deformation of the oscillation supporting point shaft portion is caused and a malfunction is generated. Further, in the case that the travel crawler climbs over a convex portion such as a dike of a farm field or the like, at a time of moving forward or moving backward, the travel crawler is inclined upward or downward to the front side around the oscillation supporting point shaft, and an angle of incline in the back and forth direction of the ground side surface of the travel crawler tends to become larger. Accordingly, a ground height of the travel machine body tends to be changed, and there has been a problem that it is impossible to maintain a good ride quality of an operator boarding on a control seat.

Accordingly, the present invention intends to provide a working vehicle to which an improvement is applied after making a study of the actual conditions as mentioned above.

SUMMARY OF THE INVENTION

According to a first aspect of the invention, there is provided a working vehicle having a travel machine body which mounts an engine thereon, a track frame which is provided in a lower portion of the travel machine body, and a travel crawler which is installed to the track frame via a drive wheel body and a driven wheel body, wherein the track frame is structured such that a pair of steel plate bodies are detachably fastened by a fastening member, wide surfaces of the steel plate bodies being faced to each other.

According to a second aspect of the invention, there is provided the working vehicle described in the first aspect, wherein an attaching portion of a rolling wheel support body is pinched by the pair of steel plate bodies, the rolling wheel support body rotatably pivoting rolling wheels for grounding the travel crawler.

According to a third aspect of the invention, there is provided the working vehicle described in the second aspect, wherein a crawler guide body for preventing the travel crawler from being detached and pressing a core metal body is pinched by the pair of steel plate bodies.

According to a fourth aspect of the invention, there is provided the working vehicle described in the second aspect, wherein the driven wheel body is constructed by a pair of front and rear driven wheel bodies, and a base end portion of a retractable tension adjusting mechanism supporting the front driven wheel body is pinched by the pair of steel plate bodies.

According to a fifth aspect of the invention, there is provided the working vehicle described in the fourth aspect, wherein a base end portion of a pivot member pivoting the rear driven wheel body is pinched by the pair of steel plate bodies.

According to a sixth aspect of the invention, there is provided the working vehicle described in the first aspect, wherein a link support body is attached to a rear axle case which transmits a rotary power to the drive wheel body, the track frame is coupled to the link support body via a pair of front and rear link members so as to be capable of oscillating forward and backward, the driven wheel body is constructed by a pair of front and rear driven wheel bodies, and a lower end side of the rear link member is rotatably pivoted to a rotary support shaft of the rear driven wheel body.

According to a seventh aspect of the invention, there is provided the working vehicle described in the sixth aspect, wherein the rotary support shaft protrudes from the rear driven wheel body to the laterally center side, a lower end side of the rear link member is rotatably pivoted to the protruding portion, and the rear driven wheel body is supported in a cantilever manner.

According to an eighth aspect of the invention, there is provided the working vehicle described in the sixth aspect, wherein the link support body is attached to the laterally outermost side portion of the rear axle case.

According to a ninth aspect of the invention, there is provided the working vehicle described in the eighth aspect, wherein the front and rear link members are housed in a lateral width of the travel crawler in the half or more part of their shape as seen from a forward moving direction of the travel machine body.

According to a tenth aspect of the invention, there is provided the working vehicle described in the eighth or ninth aspect, wherein a lower link attaching pin is provided for pivoting a base end side of a lower link arranged in the rear portion of the travel machine body and is extended outward in a lateral direction, one end side of the lower link attaching pin is detachably supported to a transmission case, and the other end side thereof is detachably supported to the link support body.

According to the invention of the first aspect, since in the working vehicle having the travel machine body which mounts the engine thereon, the track frame which is provided in the lower portion of the travel machine body, and the travel crawler which is installed to the track frame via the drive wheel body and the driven wheel body, the track frame is structured such that the pair of steel plate bodies are detachably fastened by the fastening member, the wide surfaces of the steel plate bodies being faced to each other, it is possible to achieve a weight saving more widely in comparison with the conventional track frame which is made of the square pipe member. In addition, the assembling workability of the travel crawler 25 can be also improved. Further, since the track frame is constructed by a pair of steel plate bodies in which the wide surfaces thereof are faced to each other, a muddy soil is hard to pass through the travel crawler laterally, and it is possible to achieve an effect for preventing a side slip.

According to the invention of the second aspect, since the attaching portion of the rolling wheel support body rotatably pivoting the rolling wheels for grouding the travel crawler is pinched by the pair of steel plate bodies, the attaching portion of the rolling wheel support body can be utilized as a reinforcing member of the track frame, and it is possible to enhance a rigidity of the track frame. An assembling workability of the rolling wheel in relation to the track frame is also good.

According to the invention of the third aspect, since the crawler guide body for preventing the travel crawler from being detached and pressing the core metal body is pinched by the pair of steel plate bodies, the crawler guide body can be utilized as the reinforcing member of the track frame, and it is possible to contribute to an improvement of the rigidity of the crawler frame, in the same manner as the case of the second aspect.

According to the invention of the fourth aspect, since the driven wheel body is constructed by a pair of front and rear driven wheel bodies, and the base end portion of the retractable tension adjusting mechanism supporting the front driven wheel body is pinched by the pair of steel plate bodies, the base end portion of the tension adjusting mechanism can be utilized as the reinforcing member of the track frame, and it is possible to contribute to the improvement of the rigidity of the track frame, even in this case, in the same manner as the cases of the second aspect and the third aspect.

According to the invention of the fifth aspect, since the base end portion of the pivot member pivoting the rear driven wheel body is pinched by the pair of steel plate bodies, the base end portion of the pivot member can be utilized as the reinforcing member of the track frame, and it is possible to contribute to the improvement of the rigidity of the track frame, even in this case, in the same manner as the cases of the second to fourth aspects.

According to the invention of the sixth aspect, since the link support body is attached to the rear axle case which transmits the rotary power to the drive wheel body, the track frame is coupled to the link support body via a pair of front and rear link members so as to be capable of oscillating forward and backward, the driven wheel body is constructed by a pair of front and rear driven wheel bodies, and the lower end side of the rear link member is rotatably pivoted to the rotary support shaft of the rear driven wheel body, the rotary support shaft of the rear driven wheel body can serve as a supporting point below the rear link member, and it is possible to achieve a simplification of a coupling support structure between the track frame and the rear link member, further a simplification of a coupling support structure between the track frame and the travel machine body, a weight saving and a reduction of parts number.

According to the invention of the seventh aspect, since the rotary support shaft protrudes from the rear driven wheel body to the laterally center side, the lower end side of the rear link member is rotatably pivoted to the protruding portion, and the rear driven wheel body is supported in the cantilever manner, it is possible to promote the effect of the sixth aspect. In other words, this structure is effective in the light of the simplification of the coupling support structure between the rear driven wheel body and the rear link member, and the improvement of the assembling workability.

According to the invention of the eighth aspect, since the link support body is attached to the laterally outermost side portion of the rear axle case, it is possible to reduce a protruding amount at which the front and rear link members protrude from the travel crawler to the laterally center side. It is possible to inhibit the muddy soil from being attached to the front and rear link members, whereby it is possible to reduce a problem that the muddy soil interferes with the member in the periphery of the front and rear link members which oscillate forward and backward.

According to the invention of the ninth aspect, since the front and rear link members are housed in the lateral width of the travel crawler in the half or more part of their shape as seen from the forward moving direction of the travel machine body, it is possible to support the front and rear link members while being sufficiently spaced from the ridge or the high crop plant, for example, at the ridge overstriding work of the working vehicle, and it is easy to avoid a risk that the front and rear link members break the ridge or get down the high crop plant.

According to the invention of the tenth aspect, since the lower link attaching pin is provided for pivoting the base end side of the lower link arranged in the rear portion of the travel machine body and is extended outward in the lateral direction, one end side of the lower link attaching pin is detachably supported to the transmission case, and the other end side thereof is detachably supported to the link support body, it is possible to simplify the attaching support structure of the lower link, the workability for attaching or detaching the lower link, further the various working machines is improved, and it is possible to reduce the parts number so as to contribute to a cost suppression.

DETAILED DESCRIPTION OF THE PREFERRED EMBODIMENTS

Figure 1:
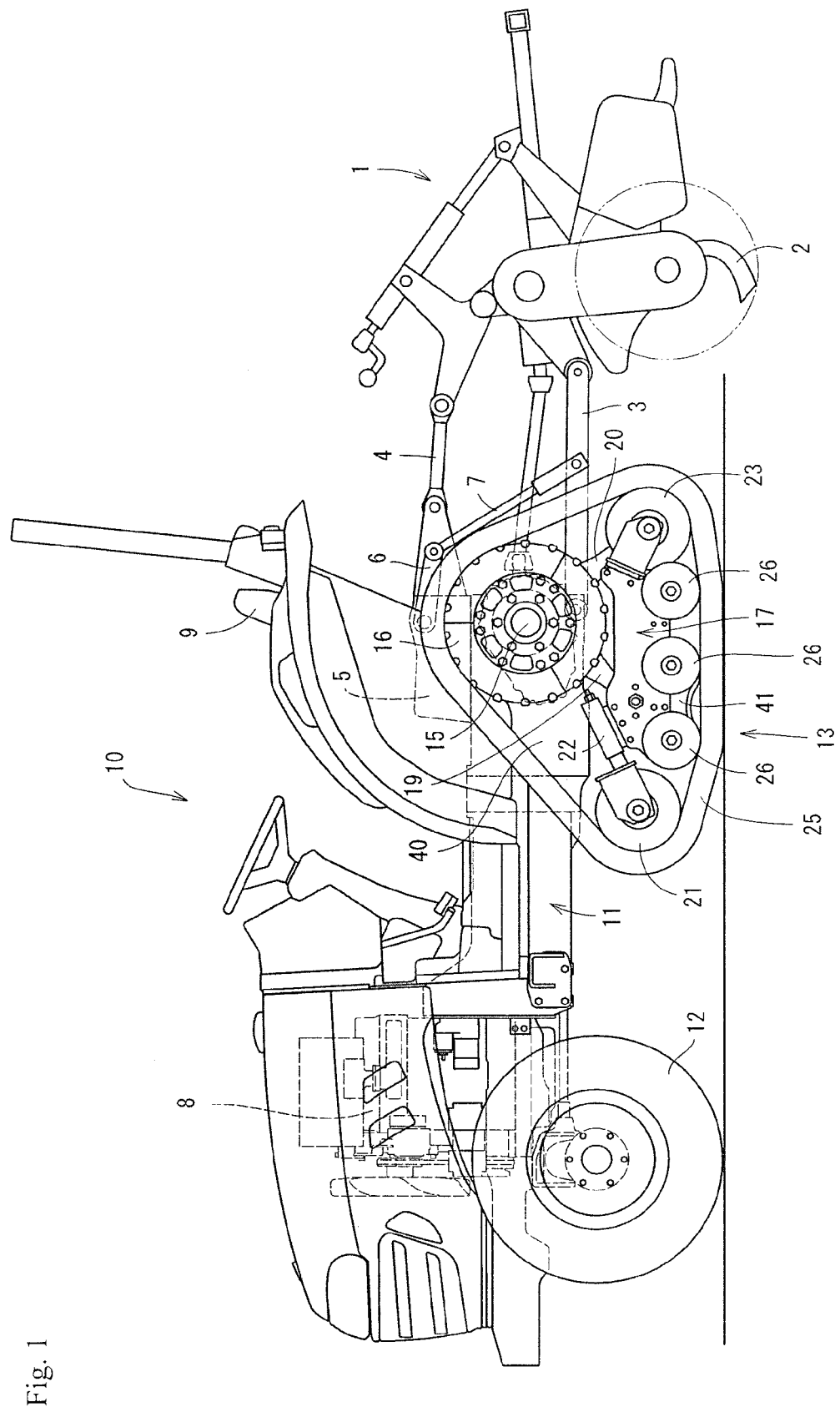
FIG. 1 is a side elevational view of a tractor in an embodiment.
Figure 2:
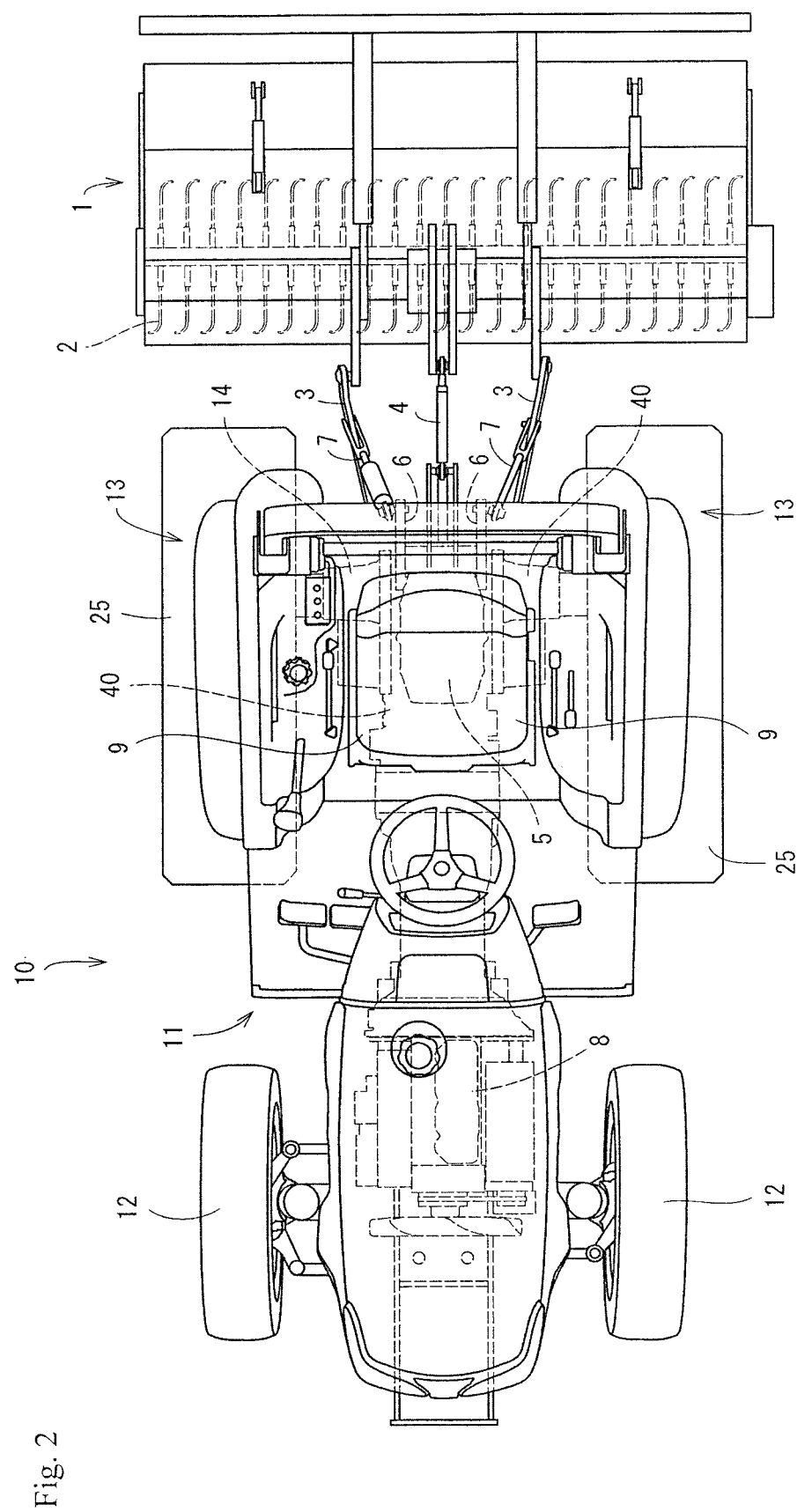
FIG. 2 is a plan view of the tractor.
Figure 3:
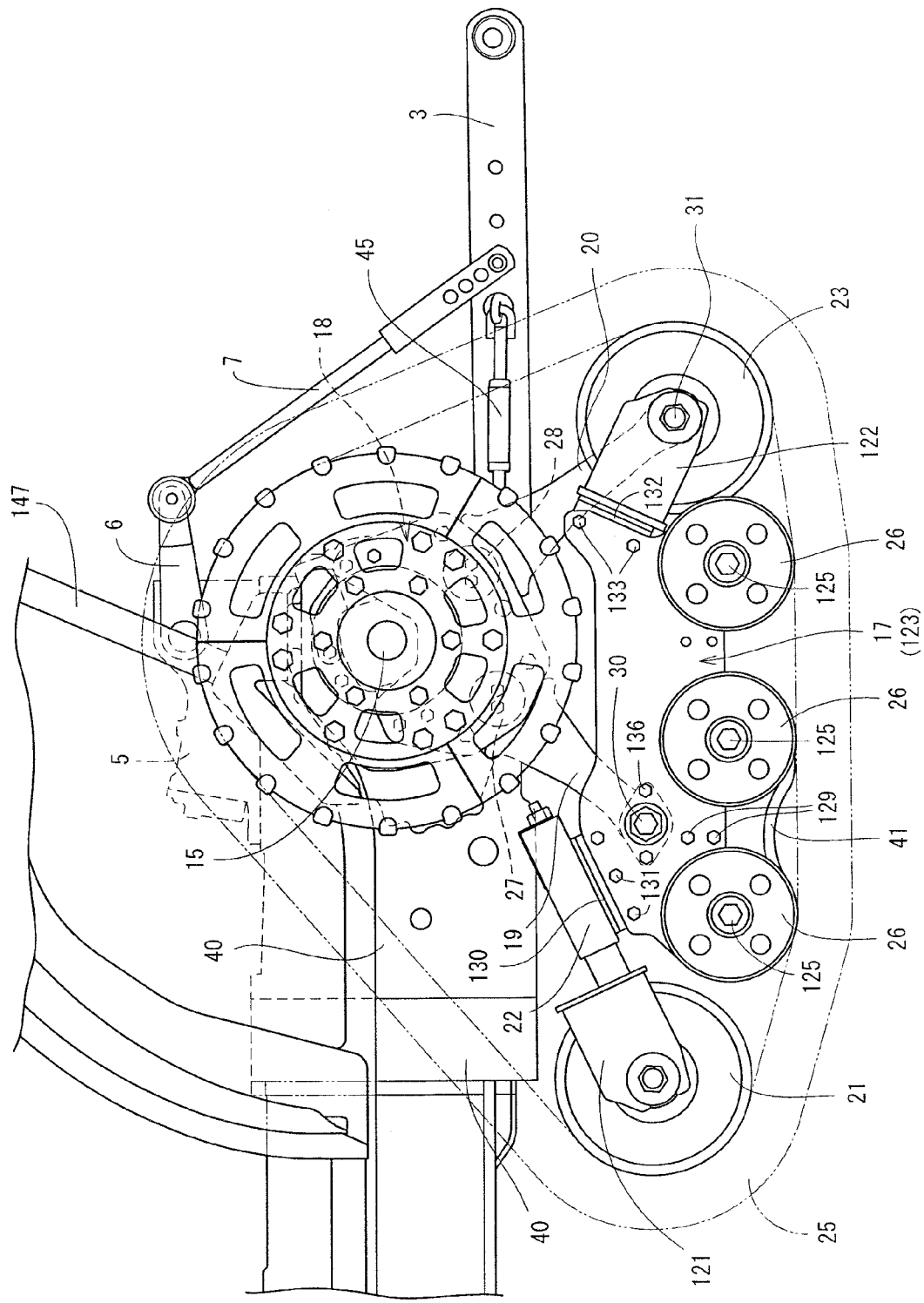
FIG. 3 is an enlarged side elevational view of a rear crawler travel device.

A description will be given below of an embodiment obtained by embodying the present invention on the basis of the drawings in the case of being applied to a tractor which is an example of a working vehicle. As shown in FIGS. 1 to 3, a tractor 10 according to the embodiment, is provided with a travel machine body 11, a pair of right and left front wheels 12 which support a front portion of the travel machine body 11, and a pair of right and left rear crawler travel devices 13 which support a rear portion of the travel machine body 11. The travel machine body 11 mounts an engine 8 thereon and is provided with a control seat 9.

Figure 7:
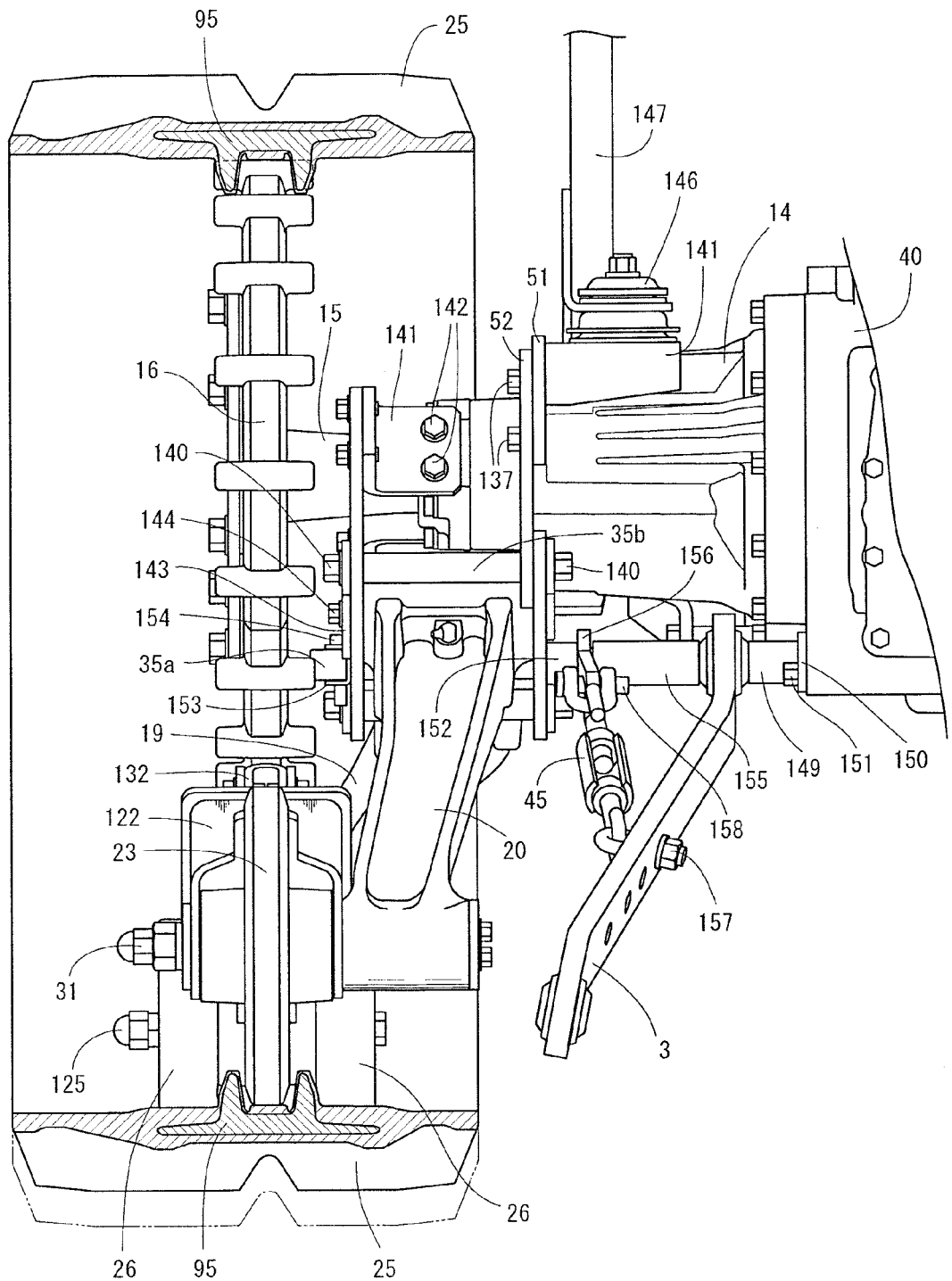
FIG. 7 is a partly cut away back elevational view of the rear crawler travel device.
Figure 8:
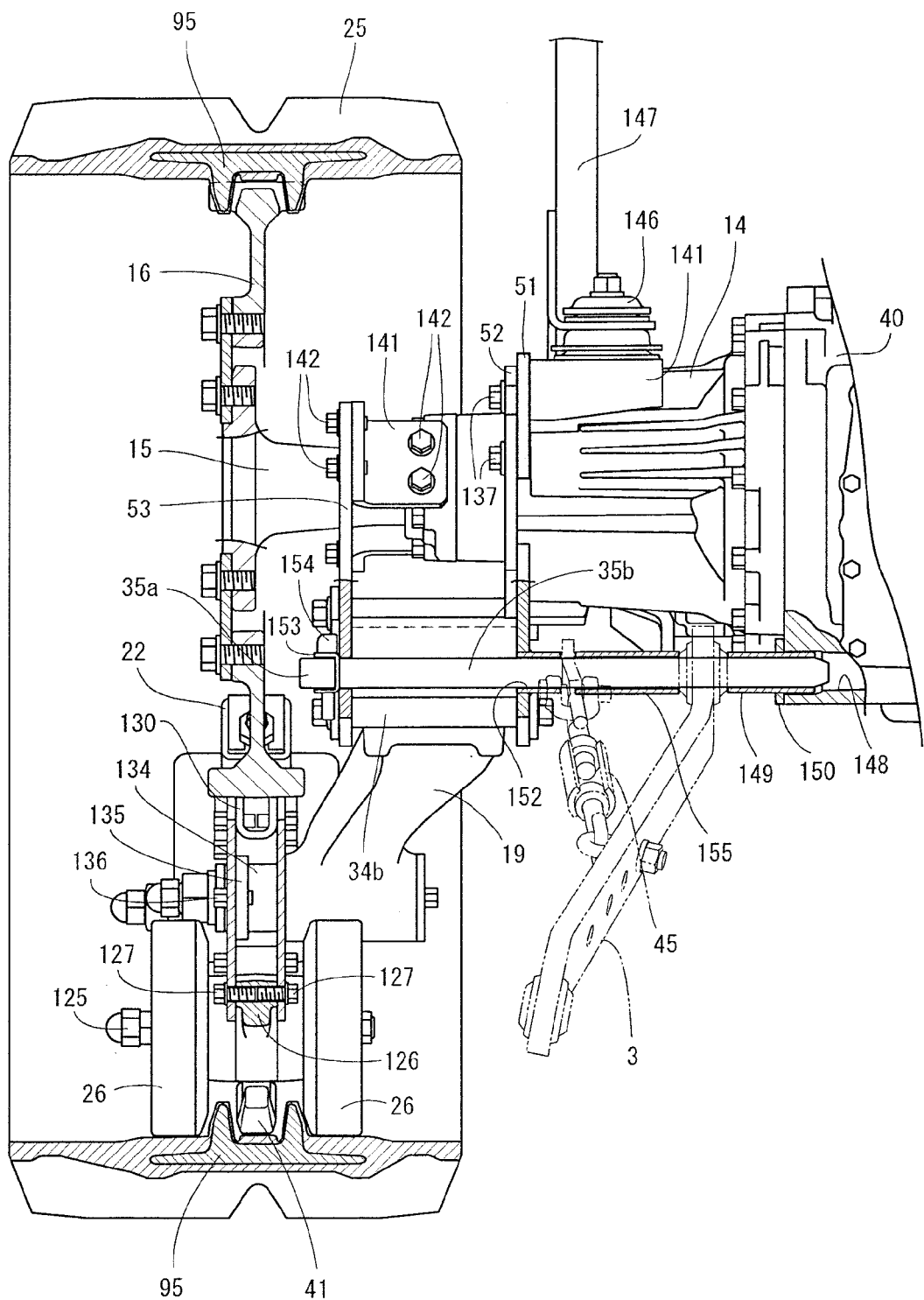
FIG. 8 is a substantial part cut away back elevational view of the rear crawler travel device.

As shown in FIGS. 1 to 3, a transmission case 40 is mounted on a rear portion of the travel machine body 11. Right and left rear axle cases 14 are provided in both right and left sides of the transmission case 40. The rear crawler travel device 13 is detachably mounted to the travel machine body 11 via the rear axle case 14. As shown in FIGS. 7 and 8, one end side of a rear axle 15 is pivoted within the rear axle case 14, and the other end side of the rear axle 15 is protruded from the rear axle case 14 outward to the right and left. A drive wheel body 16 is attached to the other end side of the rear axle 15. A track frame 17 which extends in a back and forth direction is arranged below the rear axle case 14. A link support body 18 is detachably fastened and fixed to the rear axle case 14. There are provided a front link member 19 which is arranged in a front side of the rear axle 15, and a rear link member 20 which is arranged in a rear side of the rear axle 15. The track frame 17 is connected to the link support body 18 via the link members 19 and 20 so as to be movable forward and backward.

As shown in FIGS. 1 to 3, a front driven wheel body 21 is attached to a front end side of the track frame 17 via a tension adjusting mechanism 22. In the embodiment, a front driven wheel body 21 is rotatably pivoted to a bifurcated front arm 121 which constructs a front end side of the tension adjusting mechanism 22. A rear driven wheel body 23 is attached to a rear end side of the track frame 17 via a bifurcated rear arm 122 which serves as a pivot member. The rear driven wheel body 23 in the embodiment is rotatably pivoted to a rear end side of the bifurcated rear arm 122. A travel crawler 25 serving as a crawler belt and made of a synthetic rubber is wound in an approximately triangular shape around three elements including the drive wheel body 16, the front driven wheel body 21 and the rear driven wheel body 23. The travel machine body 11 is structured such as to travel forward or backward by forward rotating or reverse rotating the drive wheel body 16 (the rear axle 15) at an appropriate speed and driving the travel crawler 25 so as to forward rotate or reserve rotate.

There are provided a plurality of rolling wheels 26 and a crawler guide body 41. The track frame 17 is provided rotatably with a plurality of roiling wheels 26. The crawler guide body 41 is provided for preventing the travel crawler 25 from being detached in a lateral direction and pressing a plurality of core metal bodies 95 (refer to FIGS. 7 and 8) which are buried in the travel crawler 25 at a uniform interval, and is fastened and fixed to the track frame 17. A plurality of rolling wheels 26 and the crawler guide body 41 are brought into contact with an inner peripheral surface between the front driven wheel body 21 and the rear driven wheel body 23 (an inner peripheral surface closer to a ground side of the travel crawler 25), in an inner peripheral surface of the travel crawler 25. The crawler guide body 41 is formed as an inverted-T shape in a side elevational view. A lower center portion of the crawler guide body 41, that is, a position between the front side roiling wheel 26 and the center rolling wheel 26 in the crawler guide body 41 is concaved upward, and avoids contact with the ground side of the travel crawler 25.

Figure 4:
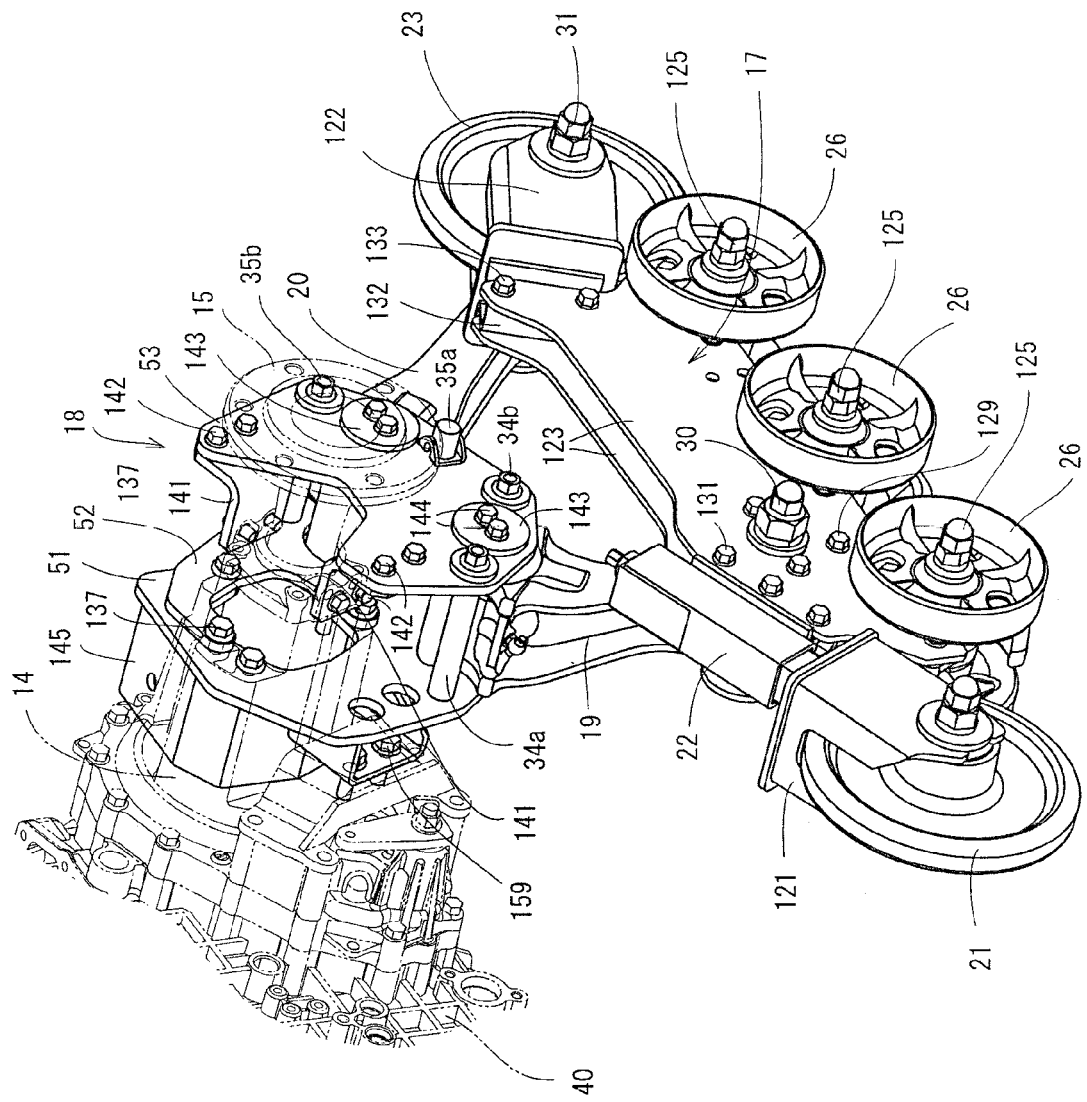
FIG. 4 is a perspective view of a track frame and a link support body as seen from a front side.

As shown in FIGS. 3 and 4, the link support body 18 is provided with front and rear upper end pivot shafts 27 and 28. The front and rear upper end pivot shafts 27 and 28 are extended in parallel to the rear axle 15. An upper end side boss portion of the front link member 19 is rotatably pivoted to the front upper end pivot shaft 27. An upper end side boss portion of the rear link member 20 is rotatably pivoted to the rear upper end pivot shaft 28. Front and rear lower end pivot shafts 30 and 31 are provided in the track frame 17 side. A lower end side of the front link member 19 is rotatably connected to the track frame 17 by the front lower end pivot shaft 30. A front portion side of the track frame 17 is supported in a cantilever manner by the front link member 19 and the front lower end pivot shaft 30. The front lower end pivot shaft 30 is positioned in a front side of the front upper end pivot shaft 27, and the front link member 19 is inclined diagonally downward in a forward direction so as to be supported.

Figure 5:
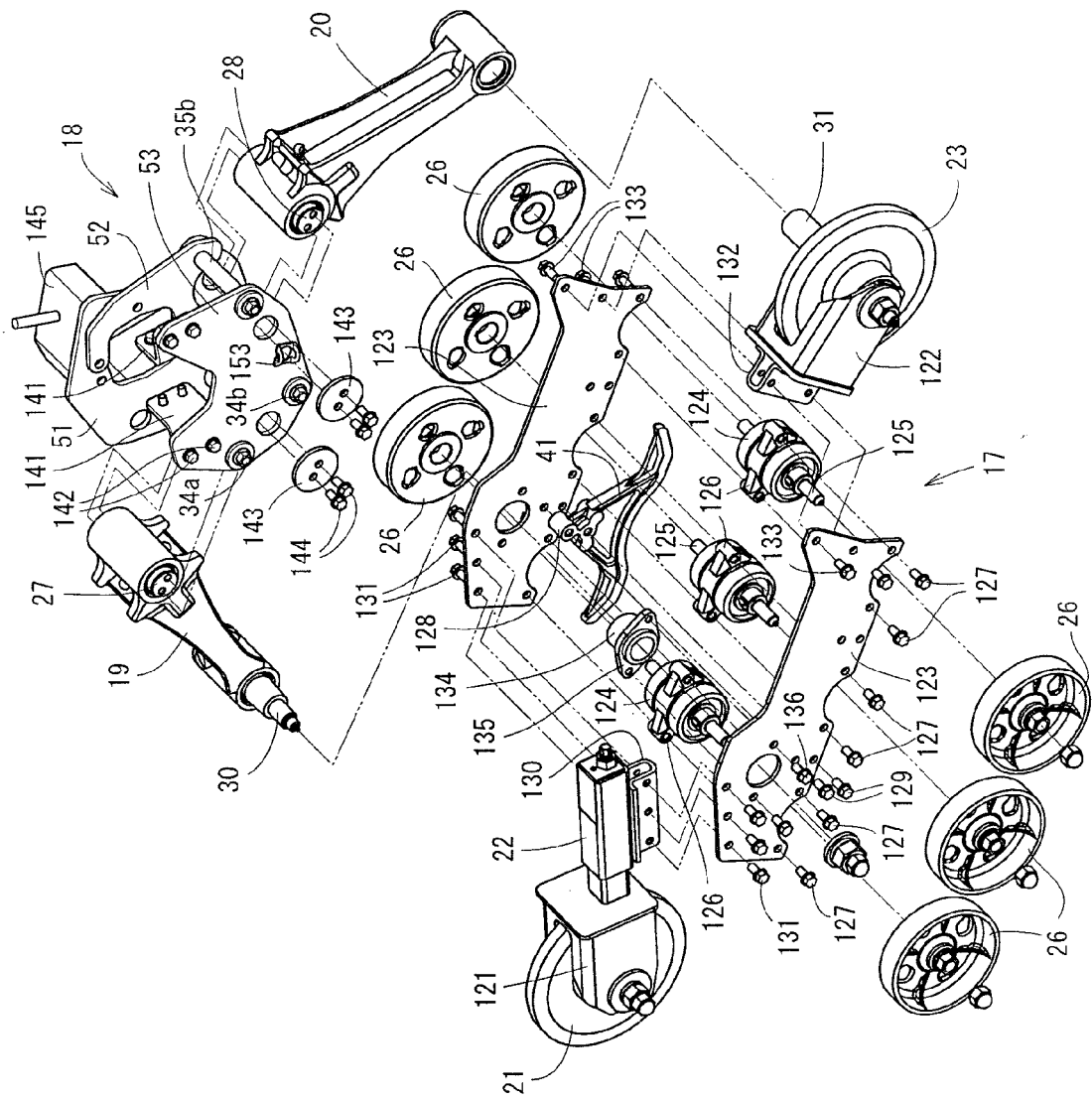
FIG. 5 is a separated perspective view of the track frame.
Figure 6:
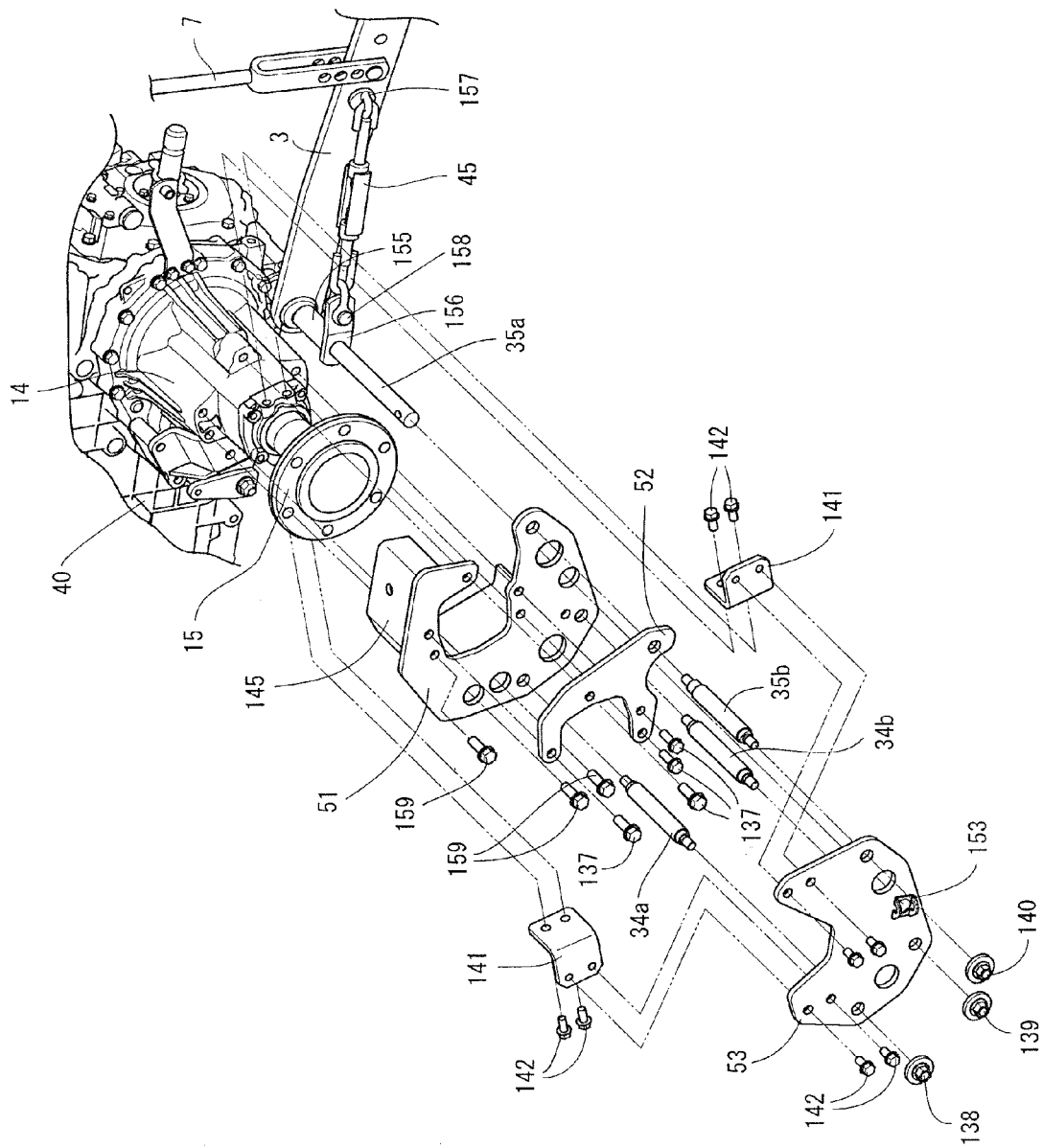
FIG. 6 is a separated perspective view of the link support body.

Further, as shown in FIGS. 4 to 6, a rotary support shaft of the rear driven wheel body 23 pivoted to the bifurcated rear arm 122, that is, the rear lower end pivot shaft 31 protrudes from the rear driven wheel body 23 to the center side in a lateral direction (an inner side in the lateral direction). A protruding portion of the rear lower end pivot shaft 31 is rotatably inserted and installed to the lower end side of the rear link member 20. The rear driven wheel body 23 is supported in a cantilever manner by the rear link member 20 and the rear lower end pivot shaft 31. The rear lower end pivot shaft 31 is positioned in a rear side of the rear upper end pivot shaft 28, and the rear link member 20 is inclined diagonally downward in a rear side so as to be supported. The rear driven wheel body 23 may be supported like a beam supported at both ends by protruding the rear lower end pivot shaft 31 from the rear driven wheel body 23 to both the right and left sides, and rotatably pivoting the lower end side of the rear link member 20 to both the right and left protruding portions. In this case, the rear driven wheel body 23 can be stably supported by the rear link member 20.

Therefore, the front and rear lint members 19 and 20 are formed as a tapered attitude which is widened to the end in a side elevational view (refer to FIG. 3) of the tractor 10. The travel crawler 25 is provided in a tension manner as an approximately triangular shape in a side elevational view of the tractor 10, so that; a distance from a vertical line passing through the rear axle 15 to the front driven wheel body 21 is larger than a distance from the vertical line to the rear driven wheel body 23.

In the structure mentioned above, in the case that the tractor 10 is traveled forward, the travel crawler 25 is exposed to a forward movement reaction force from the ground surface, whereby the track frame 17 moves in a forward direction in relation to the travel machine body 11, and the travel crawler 25 is inclined to a forward rising attitude. In other words, in the case that the track frame 17 moves in a forward direction in relation to the travel machine body 11, the front link member 19 is rotated around the front upper end pivot shaft 27 as a supporting point in a tilting direction in which an angle of incline in relation to the horizontal surface becomes smaller. Further, the rear link member 20 is rotated around the rear upper end pivot shaft 28 as a supporting point in a rising direction in which the angle of incline in relation to the horizontal surface becomes larger. As a result, the tractor 10 (the travel machine body 11) moves forward while inclining the travel crawler 25 upward to the front side.

On the other hand, in the case that the tractor 10 is traveled rearward, the travel crawler 25 is exposed to a rearward movement reaction force from the ground surface, whereby the track frame 17 moves in a rearward direction in relation to the travel machine body 11, and the travel crawler 25 is inclined to a forward down attitude. In other words, in the case that the track frame 17 moves in a rearward direction in relation to the travel machine body 11, the front link member 19 is rotated around the front upper end pivot shaft 27 as a supporting point in a rising direction in such a manner that the angle of incline in relation to the horizontal surface becomes larger. Further, the rear link member 20 is rotated around the rear upper end pivot shaft 28 as a supporting point in a sideward tiling direction in such a manner that the angle of incline in relation to the horizontal surface becomes smaller. As a result, the tractor 10 (the travel machine body 11) moves rearward while inclining the travel crawler 25 downward to the front side.

In the case of interrupting the drive of the travel crawler 25 in an inner side of a swivel so as to swivel and move in a leftward direction or a rightward direction, the travel crawler 25 in the inner side of the swivel is inclined downward to the front side at a time of traveling forward, and the travel crawler 25 in the inner side of the swivel is inclined upward to the front side at a time of traveling backward.

As shown in FIGS. 4 and 6, the link support body 18 rotatably supporting the upper end sides of both the front and rear link members 19 and 20 is provided with regulation pins 34a, 34b, 35a and 35b which serve as a stopper for regulating a forward and backward rotating range of the link members 19 and 20. A range in which a lower end side of the front link member 19 rotates forward and backward around the front upper end pivot shaft 27 as a supporting point is set by the first front regulation pin 34a and the first rear regulation pin 34b. A range in which a lower end side of the rear link member 20 rotates forward and backward around the rear upper end pivot shaft 28 as a supporting point is set by the second front regulation pin 35a and the second rear regulation pin 35b. A forward and backward movement of the travel crawler 25 in relation to the travel machine body 11 is limited by the front and rear regulation pins 34a, 34b, 35a and 35b.

In the case of carrying out a pitching motion (a forward tilting motion) in such a manner that the travel machine body 11 comes down to the front side, the front link member 19 is rotated in a sideward tilting direction in which the angle of incline in relation to the horizontal surface around the front lower end pivot shaft 30 as a supporting point becomes smaller. Meanwhile, the rear link member 20 is rotated in a rising direction in which the angle of incline in relation to the horizontal surface around the rear lower end pivot shaft 31 as a supporting point becomes larger in relation to the track frame 17. As a result, the travel crawler 25 is supported in a forward rising attitude in relation to the travel machine body 11.

Further, in the case of carrying out a pitching motion (a rearward tilting motion) in such a manner that the travel machine body 11 comes down to the front side, the front link member 19 is rotated in a rising direction in which the angle of incline in relation to the horizontal surface around the front lower end pivot shaft 30 as a supporting point becomes larger. Meanwhile, the rear link member 20 is rotated in a tilting direction in which the angle of incline in relation to the horizontal surface around the rear lower end pivot shaft 31 as a supporting point becomes smaller. As a result, the travel crawler 25 is supported in a forward down attitude in relation to the travel machine body 11.

In the meantime, in a four-bar link mechanism which is constructed by the link support body 18, the front link member 19, the rear link member 20 and the track frame 17, a "momentary center" at a time when the track frame 17 which is one of the bars makes a movement in a longitudinal direction thereof is positioned in an intersecting point between a virtual extension of the front link member 19 which connects the front upper end pivot shaft 27 and the front lower end pivot shaft 30, and a virtual extension of the rear link member 20 which connects the rear upper end pivot shaft 28 and the rear lower end pivot shaft 31. The track frame 17 makes a movement in a longitudinal direction thereof around the "momentary center".

Since the front and rear link members 19 and 20 are arranged in the tapered shape which is widened to the end, the "momentary center" moves to a rear side of the travel machine body 11 in the case that the travel machine body 11 pitches downward to the front side, and moves to a front side of the travel machine body 11 in the case that the travel machine body 11 pitches upward to the front side. The "momentary center" is retained at a height position which is similar to a height of the rear axle 15. As a result, it is possible to widely reduce a distance at which the travel machine body 11 moves forward and backward in relation to the track frame 17 in the case that the travel machine body 11 pitches, in comparison with the forward and backward moving distance in the case of the prior art.

As shown in FIGS. 1 and 2, the tractor 10 is provided a rotary power tiller working machine 1 having a rotary tillage tine 2. A lower link 3 and a top link 4 (a three-point link mechanism) are protruded from a rear portion of the travel machine body 11 to a rear side, and the rotary power tiller working machine 1 is installed to the lower link 3 and the top link 4. A hydraulic lift mechanism 5 is provided in a rear portion of the travel machine body 11 (an upper portion of the transmission case 40). A back and forth intermediate portion of the lower link 3 is connected to a lift arm 6 of the hydraulic lift mechanism 5 via a lift rod 7. The rotary power tiller working machine 1 is moved up and down on the basis of an operation of the hydraulic lift mechanism 5, and a cultivated soil in a farm field is tilled by the rotary drive of the rotary tillage tine 2. It goes without saying that various working machines, such as, a plow can be installed to the tractor 10, in place of the rotary power tiller working machine 1.

Next, a description will be given of a detailed structure of the track frame 17 with reference to FIGS. 4 to 8. The track frame 17 has a pair of right and left steel plate bodies 123 which are faced their wide surfaces to each other and are formed as a tabular shape. Both the right and left steel plate bodies 123 are formed in the same shape. Both the steel plate bodies 123 are structured such that the wide surfaces are faced to each other at an appropriate distance in a lateral direction, in such a manner that a thickness direction is a lateral direction which is parallel to the rear axle 15. Accordingly, a comparatively wide range of the inner peripheral lower portion side in the travel crawler 25 is covered (closed, refer to FIG. 3) with the wide surface of the steel plate body 123.

A rolling wheel support body 124 rotatably pivoting each of the rolling wheels 26 is arranged in a lower portion side between both the steel plate bodies 123. A rolling wheel shaft 125 is protruded from the rolling wheel support body 124 to both right and left sides. The rolling wheels 26 are respectively connected to both the right and left protruding end sides. In the embodiment, three rolling wheel support bodies 124 are provided in a back and forth direction. Therefore, three sets of (six) rolling wheels 26 are provided in a structure in which two rolling wheels form one set. An attaching portion 126 formed in an upper portion side of each of the rolling wheel support bodies 124 is positioned between both the steel plate bodies 123, in a state in which the attaching portion 126 of the rolling wheel support bodies 124 is pinched by both the steel plate bodies 123, the attaching portion 126 is fastened to both the steel plate bodies 123 by bolts 127 in a state of being supported at both ends.

The crawler guide body 41 is arranged between the rolling wheel support body 124 in the front side and the rolling wheel support body 124 at the center. The crawler guide body 41 is famed as an inverted-T shape in a side elevational view. An upper portion side 128 of the crawler guide body 41 is positioned between both the steel plate bodies 123. In a state in which the upper portion side 128 is pinched by both the steel plate bodies 123, the upper portion side 128 is fastened to both the steel plate bodies 123 by bolts 129 in a state of being supported at both ends.

Further, a front pedestal bracket 130 provided in a base end portion (a lower surface side in a rear side) of the tension adjusting mechanism 22 is arranged in a front upper side between both the steel plate bodies 123. The front driven wheel body 21 is attached to the front end side of the track frame 17 via the tension adjusting mechanism 22 by fastening the front pedestal bracket. 130 to both the steel plate bodies 123 by bolts 131 while being supported at both ends, in a state in which the front pedestal bracket 130 is pinched by both the steel plate bodies 123.

Meanwhile, a rear pedestal bracket 132 provided in a base end portion (a front end side) of the bifurcated rear arm 122 corresponding to the pivot member is arranged in a rear end side between both the steel plate bodies 123. The rear driven wheel body 23 is attached to the rear end side of the track frame 17 via the bifurcated rear arm 122 by fastening the rear pedestal bracket. 132 to both the steel plate bodies 123 by bolts 133 while being supported at both ends, in a state in which the rear pedestal bracket 132 is pinched by both the steel plate bodies 123.

Accordingly, each of the members pinched by both the steel plate bodies 123, that is, the attaching portion 126 of the rolling wheel support body 124, the upper portion side 128 of the crawler guide body 41, and the front and rear pedestal brackets 130 and 132 serves as a spacer for making the wide surfaces of both the steel plate bodies 123 face to each other at an appropriate distance in a lateral direction. Further, each of the members 126, 128, 130 and 132 serves as a reinforcing member of the track frame 17. Each of the bolts 127, 129, 131 and 133 mentioned above constructs the fastening member described in the aspects.

A pivot shaft receiving tube body 134 serving as a bearing member fitted to the front lower end pivot shaft 30 is arranged above the upper portion side 128 of the crawler guide body 41 between both the steel plate bodies 123. Right and left end portions of the pivot shaft receiving tube body 134 respectively pass through the right and left steel plate bodies 123. A flange portion 135 is welded and fixed to an outer peripheral side of the pivot shaft receiving tube body 134. In a state in which the flange portion 135 is brought into contact with inward wide surfaces of the right and left outer steel plate bodies 123, the flange portion 135 is fastened to the right and left outer steel plate bodies 123 by bolts 136 in a cantilever manner. The front lower end pivot shaft 30 is passed through both the steel plate bodies 123 and the pivot shaft receiving tube body 134, and the front lower end pivot shaft 30 is inserted and fixed to the pivot shaft receiving tube body 134.

Next, a description will be given of an attaching structure of the link support body 18 in relation to the rear axle case 14 with reference to FIGS. 4 to 8. As shown in FIGS. 7 and 8, the link support body 18 is attached to right and left outermost portions of the rear axle case 14, and has first and second bracket bodies 51 and 52 which pinch the rear axle case 14 from front and rear sides and are made of a tabular shaped steel plate, and a third bracket body 53 which is made of a tabular shaped steel plate. The first and second bracket bodies 51 and 52 are fastened in common to the rear axle case 14 by a plurality of bolts 137 (four bolts in the embodiment) in a state the first and second bracket bodies 51 and 52 pinch the rear axle case 14 from front and rear side. A front portion and an upper portion side of the first bracket body 51 are directly fastened to the rear axle case 14 by bolts 159.

The first bracket body 51 and the second bracket body 52 not only be fastened in common by the bolts 137, but also be pinched and fixed to each other by making a thread portion formed in one end side of the second rear regulation pin 35b pass through, and fastening the thread portion by a nut (not shown). The thread portion formed in the other end side of the second rear regulation pin 35b passes through the third bracket body 53 and is fastened by a nut 140. In other words, the thread portions in both ends of the second rear regulation pin 35b are fastened to the first and second bracket bodies 51 and 52 and the third bracket body 53 by the nut 140 in a state of being supported at both ends.

Further, in the same manner, the thread portions in both ends in the first front regulation pin 34a are fastened to the first and second bracket bodies 51 and 52 and the third bracket body 53 by a nut 138 in a state of being supported at both ends, and the thread portions in both ends in the first rear regulation pin 34b are fastened to the first and second bracket bodies 51 and 52 and the third bracket body 53 by a nut 139 in a state of being supported at both ends. The third bracket body 53 is positioned below the rear axle 15, and an upper portion side thereof is fastened to the rear axle case 14 via a pair of front and rear L-shaped brackets 141 by bolts 142.

In a state in which the front and rear upper end pivot shafts 27 and 28 are passed through the upper end side boss portions of the front and rear link members 19 and 20 respectively, the one end sides of the front and rear upper end pivot shafts 27 and 28 are supported in a penetrating manner to the first bracket body 51. Further, the other end sides of the front and rear upper end pivot shafts 27 and 28 are fastened to the third bracket body 53 via a shaft pressing plate body 143 by bolts 144 in a cantilever manner. As is apparent from FIGS. 7 and 8, the front and rear link members 19 and 20 are housed the half or more of their shapes as seen from a forward moving direction of the travel machine body 11 within a lateral width of the travel crawler 25. In the embodiment, one third of the upper end side boss portion of each of the link members 19 and 20 protrudes from the travel crawler 25 to the center side in the lateral direction, however, the lower end side (the boss portion) of each of the link members 19 and 20 is housed within a lateral width of the travel crawler 25.

A seat plate body 145 is fixed by welding to an upper portion side of the first bracket body 51. The seat plate body 145 is put on an upper surface side of the rear axle case 14, and a vibration isolating body 146 having a rubber vibration isolator is fastened by bolts. A cabin frame 147 (refer to FIGS. 3, 7 and 8) constructing a framework of the travel machine body 11 is supported in a vibration isolating manner to the seat plate body 145 via the vibration isolating body 146.

As in detail shown in FIG. 8, the second front regulation pin 35a regulating a forward rotation of the rear link member 20 around the rear upper end pivot shaft 28 as a supporting point is formed as a laterally wide rod shape from the link support body 18 the transmission case 40. Further, the second front regulation pin 35a is inserted into a side portion insertion hole 148 which is formed in a side surface rear portion side of the transmission case 40, in a state in which the second front regulation pin 35a passes through the first and third bracket bodies 51 and 53.

In this case, a boss tube body 149 fitted to one end side of the second front regulation pin 35a is inserted into and fixed to the side portion insertion hole 148 of the transmission case 40. A flange portion 150 fixed by welding to an outer peripheral side of the boss tube body 149 is brought into contact with a side surface rear portion side of the transmission case 40, and the flange portion 150 is fastened to the transmission case 40 by a bolt 151. One end side of the second front regulation pin 35a is inserted into the boss tube body 149 which is fixed to the transmission case 40. A longitudinally midway portion of the second front regulation pin 35a passes through a support tube body 152 which is fixed by welding to the first bracket body 51.

A squared U-shaped engagement bracket 153 is fixed by welding to an outer surface side of the third bracket body 53. The other end side of the second front; regulation pin 35a transversely passes through the third bracket; body 53 and a vertical plate portion of the engagement bracket 153. A vertical come-off prevention pin 154 is inserted into and fixed to the other end side portion which passes through the vertical plate portion of the engagement bracket 153 in the second front regulation pin 35a, and upper and lower horizontal plate portions of the engagement bracket 153. Accordingly, the second front regulation pin 35a is supported so as to be inserted into and extracted from the first and third bracket bodies 51 and 53 and the side portion insertion hole 148 of the transmission case 40, and is retained by the come-off prevention pin 154 so that the second front regulation pin 35a cannot rotate and cannot come off.

A spacer tube body 155 is fitted between the boss tube body 149 and the support tube body 152 in the second front regulation pin 35a. A base end side of the lower link 3 is rotatably pivoted between the boss tube body 149 and the spacer tube body 155 in the second front regulation pin 35a. Further, a vibration stop bracket body 156 is rotatably pivoted between the spacer tube body 155 and the support tube body 152 in the second front regulation pin 35a. The vibration stop bracket body 156 and the lower link are connected via right and left turn buckle type check chain bodies 45 which serve as a stabilizer for preventing the rotary power tiller working machine 1 (the right and left lower links 3) from oscillating right and left more than necessary. One end side of the check chain body 45 is connected by a pin 157 to a longitudinally midway portion of the lower link 3, and the other end side of the check chain body 45 is detachably connected by a pin 158 to the vibration stop bracket body 156.

in the case that the lower link 3 and the rotary power tiller working machine 1 are intended to be detached from the tractor 10, the lower link 3 can be detached together with the check chain body 45 by cancelling the connection to the lift rod 7 and extracting the second front regulation pin 35a after detaching the come-off prevention pin 154. Since the second front regulation pin 35a regulating the forward rotation of the rear link member 20 around the rear upper end pivot shaft 28 serves as a member for attaching the lower link 3, as mentioned above, the structure for attaching and supporting the lower link 3 can be simplified. Therefore, an attaching and detaching workability of the lower link 3, further that of various working machines is improved, and it is possible to reduce the parts number, thereby contributing to a cost reduction. In other words, the second front regulation pin 35a corresponds to a lower link attaching pin.

According to the structure mentioned above, since in the working vehicle 10 having the travel machine body 11 which mounts the engine 8 thereon, the track frame 17 which is provided in the lower portion of the travel machine body 11, and the travel crawler 25 which is installed to the track frame 17 via the drive wheel body 16 and the driven wheel bodies 21 and 23, the track frame 17 is structured such that the pair of steel plate bodies 123 are detachably fastened by the fastening members 127, 129, 131 and 133, the wide surfaces of the steel plate bodies 123 being faced to each other, it is possible to achieve a weight saving more widely in comparison with the conventional track frame which is made of the square pipe member. In addition, the assembling workability of the travel crawler 25 can be also improved. Further, since the track frame 17 is constructed by a pair of steel plate bodies 123 in which the wide surfaces thereof are faced to each other, a muddy soil is hard to pass through the travel crawler 25 laterally, and it is possible to achieve an effect for preventing a side slip.

In the embodiment, since the attaching portion 126 of the rolling wheel support body 124 rotatably pivoting the roiling wheels 26 for grouding the travel crawler 25 is pinched by the pair of steel plate bodies 123, the attaching portion 126 of the rolling wheel support body 124 can be utilized as a reinforcing member of the track frame 17, and it is possible to enhance a rigidity of the track frame 17. An assembling workability of the rolling wheel 26 in relation to the track frame 17 is also good.

Further, since the crawler guide body 41 for preventing the travel crawler 25 from being detached and pressing the core metal body is pinched by the pair of steel plate bodies 123, the crawler guide body 41 can be utilized as the reinforcing member of the track frame 17, and it is possible to contribute to an improvement of the rigidity of the track frame 17, in the same manner as the attaching portion. 126 of the rolling wheel support body 124.

Further, since the driven wheel bodies 21 and 23 are constructed by a pair of front and rear driven wheel bodies, and the base end portion (the front pedestal bracket 130) of the retractable tension adjusting mechanism 22 supporting the front driven wheel body 21 is pinched by the pair of steel plate bodies 123, the base end portion (the front pedestal bracket 130) of the tension adjusting mechanism 22 can be utilized as the reinforcing member of the track frame 17, and it is possible to contribute to the improvement of the rigidity of the track frame 17, even in this case, in the same manner as the attaching portion 126 of the rolling wheel support body 124 and the crawler guide body 41.

In addition, since the base end portion (the rear pedestal bracket 132) of the pivot member (the bifurcated rear arm 122) pivoting the rear driven wheel body 23 is pinched by the pair of steel plate bodies 123, the base end portion (the rear pedestal bracket 132) of the pivot member (the bifurcated rear arm 122) can be utilized as the reinforcing member of the track frame 17, and it is possible to contribute to the improvement of the rigidity of the track frame 17, even in this case, in the same manner as the attaching portion 126 of the rolling wheel support body 124, the crawler guide body 41 and the base end portion (the front pedestal bracket 130) of the tension adjusting mechanism 22.

In the embodiment, since in the working vehicle 10 having the travel machine body 11 which mounts the engine 8 thereon, the track frame 17 which is provided in the lower portion of the travel machine body 11, and the travel crawler 25 which is installed to the track frame 17 via the drive wheel body 16 and the driven wheel bodies 21 and 23, the link support body 18 is attached to the rear axle case 14 which transmits the rotary power to the drive wheel body 16, the track frame 17 is coupled to the link support body 18 via a pair of front and rear link members 19 and 20 so as to be capable of oscillating forward and backward, the driven wheel bodies 21 and 23 are constructed by a pair of front and rear driven wheel bodies, and the lower end side of the rear link member 20 is rotatably pivoted to the rotary support shaft (the rear lower end pivot shaft 31) of the rear driven wheel body 23, the rotary support shaft (the rear lower end pivot shaft 31) of the rear driven wheel body 23 can be in common utilized as a supporting point below the rear link member 20, and it is possible to achieve a simplification of a coupling support structure between the track frame 17 and the rear link member 20, further a simplification of a coupling support structure between the track frame 17 and the travel machine body 11, a weight saving and a reduction of parts number.

Further, since the rotary support shaft (the rear lower end pivot shaft 31) protrudes from the rear driven wheel body 23 to the laterally center side, the lower end side of the rear link member 20 is rotatably pivoted to the protruding portion, and the rear driven wheel body 23 is supported in the cantilever manner, this structure is effective in the light of the simplification of the coupling support structure between the rear driven wheel body 23 and the rear link member 20, and the improvement of the assembling workability.

Further, since the bearing member (the pivot shaft receiving tube body 134) in relation to the supporting point in the lower side of the front link member 19 is pinched by the pair of steel plate bodies 123, the bearing member (the pivot shaft receiving tube body 134) can be utilized as the reinforcing member of the track frame 17, and it is possible to contribute to the improvement of rigidity of the track frame 17, even in this regard.

In the embodiment, since in the working vehicle 10 having the travel machine body 11 which mounts the engine 8 thereon, the track frame 17 which is provided in the lower portion of the travel machine body 11, and the travel crawler 25 which is installed to the track frame 17 via the drive wheel body 16 and the driven wheel bodies 21 and 23, the link support body 16 is attached to the rear axle case 14 which transmits the rotary power to the drive wheel body 16, the track frame 17 is coupled to the link support body 18 via the pair of front and rear link members 19 and 20 so as to be capable of oscillating forward and backward, and the link support body 18 is attached to the laterally outermost side portion of the rear axle case 14, it is possible to reduce a protruding amount at which the front and rear link members 19 and 20 protrude from the travel crawler 25 to the laterally center side. It is possible to inhibit the muddy soil from being attached to the front and rear link members 19 and 20, whereby it is possible to reduce a problem that the muddy soil interferes with the member in the periphery of the front and rear link members 19 and 20 which oscillate forward and backward.

Particularly, since the front and rear link members 19 and 20 in the embodiment are housed in the lateral width of the travel crawler 25 in the half or more part of their shape as seen from the forward moving direction of the travel machine body 11, it is possible to support the front and rear link members 19 and 20 while being sufficiently spaced from the ridge or the high crop plant, for example, at the ridge overstriding work of the tractor 10, and it is easy to avoid a risk that the front and rear link members 19 and 20 break the ridge or get down the high crop plant.

Further, since the lower link attaching pin (the second front regulation pin 35a) is provided for pivoting the base end side of the lower link. 3 arranged in the rear portion of the travel machine body 11 and is extended outward in the lateral direction, one end side of the lower link attaching pin (the second front regulation pin 35a) is detachably supported to the transmission case 40, and the other end side thereof is detachably supported to the link support body 18, it is possible to simplify the attaching support structure of the lower link 3, the workability for attaching or detaching the lower link 3, further the various working machines is improved, and it is possible to reduce the parts number so as to contribute to a cost suppression.

The present invention is not limited to the embodiment mentioned above, but can be embodied into various aspects. The structure of each of the portions is not limited to the illustrated embodiment, but can be variously changed within a scope which does not deflect from the scope of the present invention.

REFERENCE SIGNS LIST

8 Engine
11 Travel machine body
12 Front wheel
14 Rear axle case
15 Rear axle
17 Track frame
19 Front link member
20 Rear link member
22 Tension adjusting mechanism
25 Travel crawler
26 Rolling wheel
27 Front upper end pivot shaft
28 Rear upper end pivot shaft (upper pivot shaft)
30 Front lower end pivot shaft (lower pivot shaft)
31 Rear lower end pivot shaft (lower pivot shaft)
41 Crawler guide body
122 Bifurcated rear arm (pivot member)
123 Steel plate body
124 Rolling wheel support body
126 Attaching portion
127, 129, 131, 133 Bolt (fastening member)
130 Front pedestal bracket
132 Rear pedestal bracket

The invention claimed is:

1. A working vehicle comprising:
a travel machine body which mounts an engine thereon;
a track frame which is provided in a lower portion of the travel machine body; and
a travel crawler which is installed to the track frame via a drive wheel body and a driven wheel body;
wherein the track frame is structured such that a pair of steel plate bodies are detachably fastened by a fastening member, wide surfaces of the steel plate bodies being faced to each other;
wherein a link support body is attached to a rear axle case which transmits a rotary power to the drive wheel body, and the track frame is coupled to the link support body via a pair of front and rear link members so as to be capable of oscillating forward and backward;
wherein the driven wheel body is constructed by a pair of front and rear driven wheel bodies, and a lower end side of the rear link member is rotatably pivoted to a rotary support shaft of the rear driven wheel body;
wherein the link support body is attached to the laterally outermost side portion of the rear axle case; and wherein a lower link attaching pin is provided for pivoting a base end side of a lower link arranged in the rear portion of the travel machine body and is extended outward in a lateral direction, one end side of the lower link attaching pin is detachably supported to a transmission case, and the other end side thereof is detachably supported to the link support body.

2. The working vehicle according to claim 1, wherein an attaching portion of a rolling wheel support body is pinched by the pair of steel plate bodies, the rolling wheel support body rotatably pivoting rolling wheels for grounding the travel crawler.

3. The working vehicle according to claim 2, wherein a crawler guide body for preventing the travel crawler from being detached and pressing a core metal body is pinched by the pair of steel plate bodies.

4. The working vehicle according to claim 2, wherein the driven wheel body is constructed by a pair of front and rear driven wheel bodies, and a base end portion of a retractable tension adjusting mechanism supporting the front driven wheel body is pinched by the pair of steel plate bodies.

5. The working vehicle according to claim 4, wherein a base end portion of a pivot member pivoting the rear driven wheel body is pinched by the pair of steel plate bodies.

6. The working vehicle according to claim 1, wherein the rotary support shaft protrudes from the rear driven wheel body to the laterally center side, a lower end side of the rear link member is rotatably pivoted to the protruding portion, and the rear driven wheel body is supported in a cantilever manner.

7. The working vehicle according to claim 1, wherein the front and rear link members are housed in a lateral width of the travel crawler in the half or more part of their shape as seen from a forward moving direction of the travel machine body.

* * * * *